United States Patent
Rayner et al.

(10) Patent No.: US 6,765,865 B1
(45) Date of Patent: Jul. 20, 2004

(54) SIGNAL SWITCHING

(75) Inventors: Andrew Rayner, Felixstowe (GB); Nigel Hoy, Colchester (GB)

(73) Assignee: British Telecommunications public limited company, London (GB)

(*) Notice: Subject to any disclaimer, the term of this patent is extended or adjusted under 35 U.S.C. 154(b) by 297 days.

(21) Appl. No.: 10/049,026

(22) PCT Filed: Aug. 30, 2000

(86) PCT No.: PCT/GB00/03334

§ 371 (c)(1),
(2), (4) Date: Feb. 8, 2002

(87) PCT Pub. No.: WO01/19012

PCT Pub. Date: Mar. 15, 2001

(30) Foreign Application Priority Data

Sep. 8, 1999 (GB) .............................................. 9921209

(51) Int. Cl.[7] ................................................. H04J 1/16
(52) U.S. Cl. ...................................... 370/228; 370/412
(58) Field of Search ................................ 370/216–231, 370/235, 235.1, 241, 252, 351, 395.1, 395.2, 395.21, 395.62, 395.7, 412–418, 503, 509–514

(56) References Cited

U.S. PATENT DOCUMENTS

| | | | |
|---|---|---|---|
| 3,569,632 A | * | 3/1971 | Beresin et al. .............. 370/509 |
| 5,485,465 A | | 1/1996 | Liu et al. |
| 5,515,362 A | | 5/1996 | Iwase |
| 5,619,542 A | | 4/1997 | Gurney et al. |
| 5,677,931 A | | 10/1997 | Okuyama et al. |
| 5,870,403 A | | 2/1999 | Egoshi |
| 6,252,850 B1 | * | 6/2001 | Lauret ......................... 370/235 |
| 6,282,204 B1 | * | 8/2001 | Balatoni et al. ............. 370/421 |
| 6,341,149 B1 | * | 1/2002 | Bertacchini et al. ........ 375/356 |

OTHER PUBLICATIONS

Russo E., "Implementation of a Space Diversity System for Ka–Band Satellite Communications", Proceedings of the International Conference on Communications (ICC), IEEE, vol. 3, May 23, 1993, pp. 1468–1474 XP000448383.

* cited by examiner

Primary Examiner—John Pezzlo
Assistant Examiner—David Odland
(74) Attorney, Agent, or Firm—Nixon & Vanderhye P.C.

(57) ABSTRACT

A television or other signal is received via main and duplicate feeds into respective buffers. Should the main feed suffer interruption or disturbance the output is switched at a switch over to the duplicate feed, but in a staged process. Upon initial detection of disturbances read-out from the main buffer is performed using locally generated timing signals in lieu of timing signals obtained from the incoming signal. If however the disturbance s persist the two buffers are synchronized and switchover performed.

14 Claims, 2 Drawing Sheets

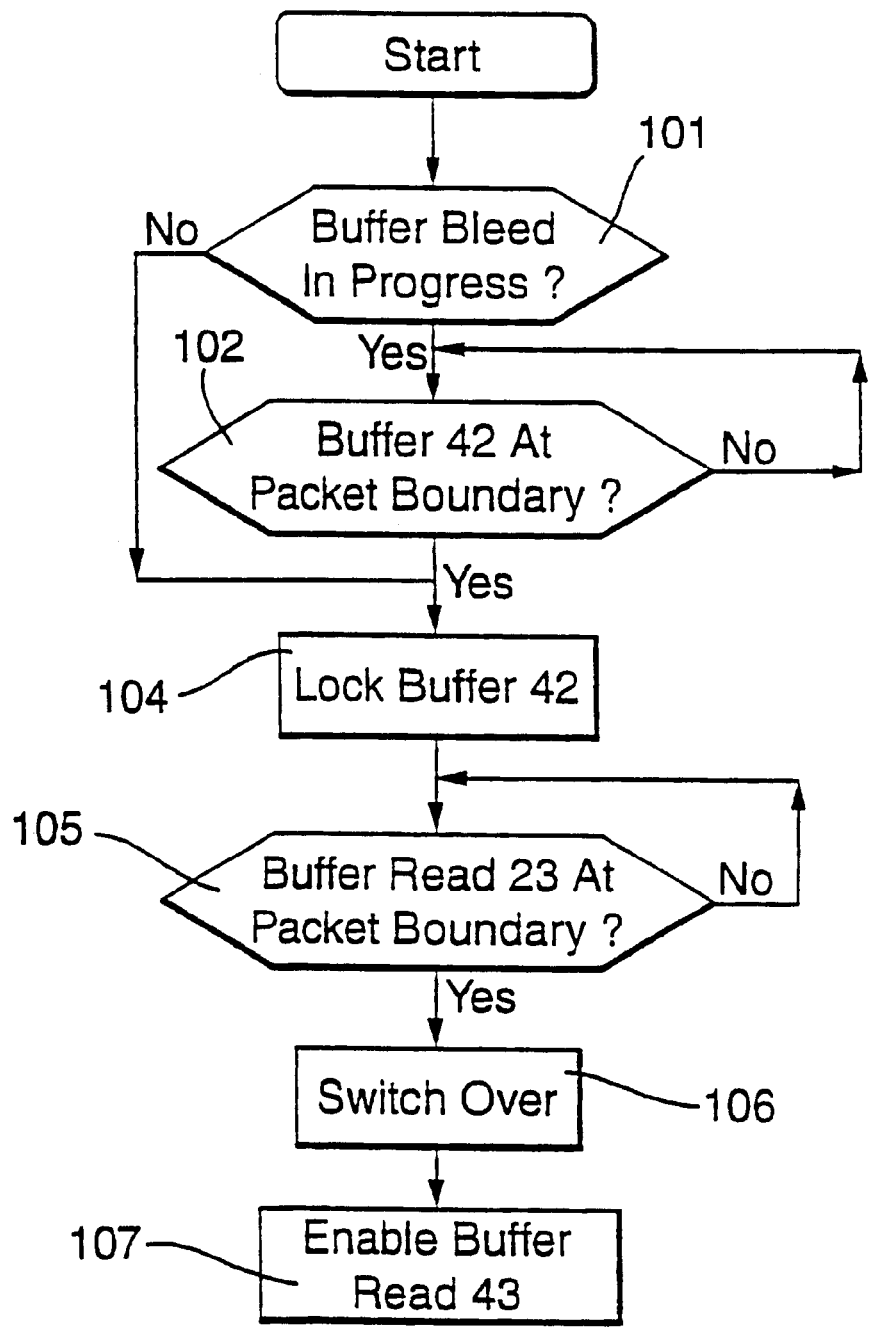

SIGNAL SWITCHING

This application is the US national phase of international application PCT/GB00/03334 filed 30 Aug. 2000 which designated the U.S.

BACKGROUND AND SUMMERY

The present invention is concerned with the switching of signals, for example for routing signals to an output from one of two alternative feeds and switching to the other feed in the event of signal disturbance of interruption. It finds particular application in the switching of digital television signals, but may also be applied to other types of signal.

BRIEF DESCRIPTION OF THE DRAWINGS

Some embodiments of the invention will now be described, by way of example, with reference to the accompanying drawings, in which:

FIG. 2 is a flowchart illustrating the operation of part of FIG. 1.

DETAILED DESCRIPTION OF EXEMPLARY EMBODIMENT

Figure 1:
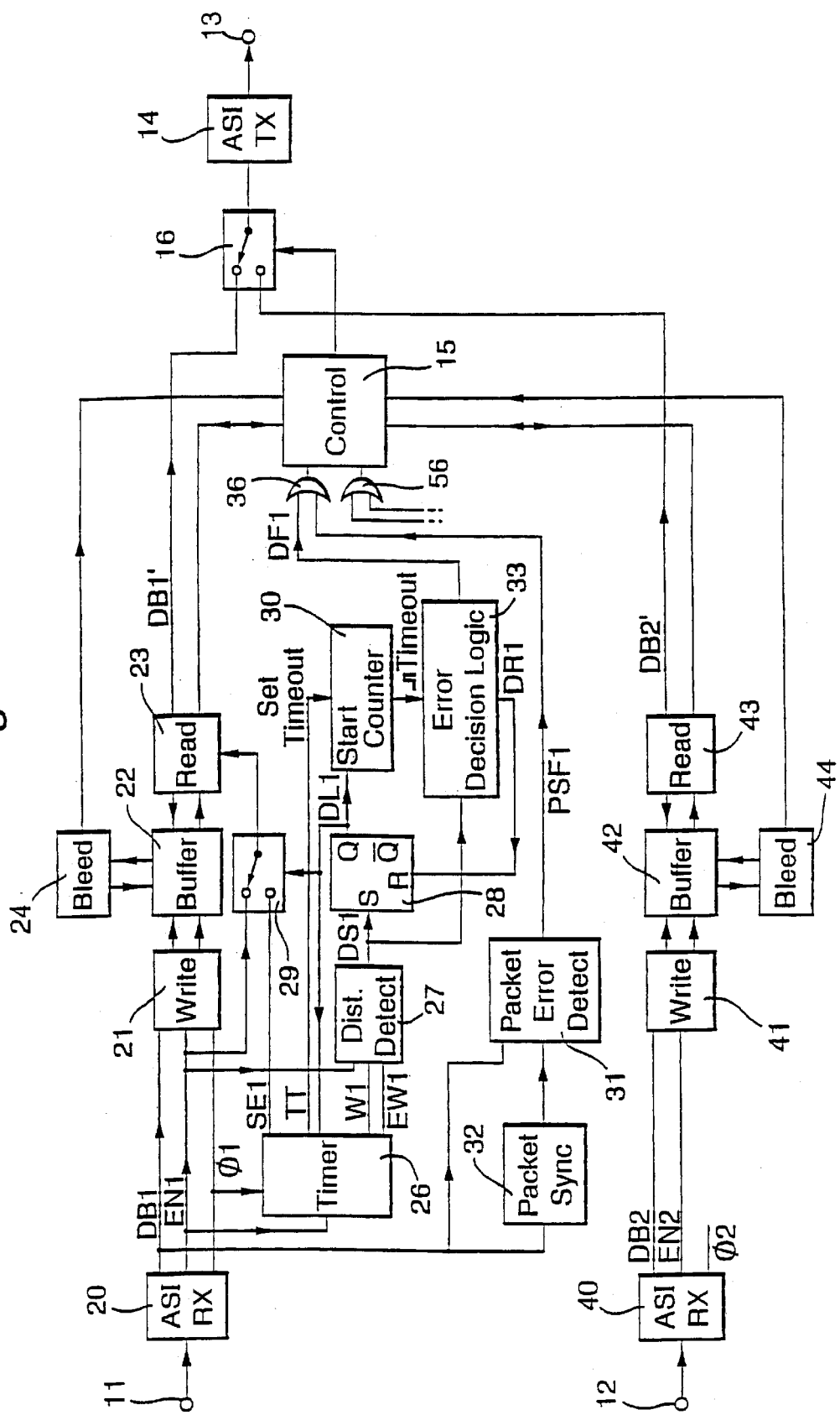
FIG. 1 is a block diagram of a switching device.

The version of the invention now to be described is a switching device for digital signals, designed specifically for digital television signals of the type used for digital television broadcasting as defined in the European Committee for Electrotechnical Standardisation (CENELEC) standard EN50083-9 dated June 1998. However it should be borne in mind that the invention does not require that the signals are formatted in accordance with this standard, or, indeed, that they be television signals at all.

The standard envisages a packet structure consisting of 204 bytes(1 byte=8 bits), comprising a synchronisation byte (47$h$) followed by 187 data bytes containing video data encoded in accordance with the so-called MPEG-2 standard (ITU standard H. 222) and 16 further bytes whose content is not prescribed but may typically contain error correction information using a Reed-Solomon code. These 16 bytes are optional, so that a 188-byte packet may be used instead. These packets may be generated at any desired data rate, so, in the interests of providing a standardised interface, the standard envisages the reformatting of these data into a higher-rate data stream according to one of a number of defined formats. The one used in this example, called the Asynchronous Serial Interface(ASI), operates at a fixed bit rate (270 Mbit/s).

Conversion of the packets into ASI format involves translating each byte into a 10-bit word using a look-up table. 512 10-bit words are allocated for this purpose (each byte has two possible translations—the one chosen being that which minimises the disparity of the transmitted signal—i.e. minimises the difference between the number of "1" bits and the number of "0" bits transmitted). Additional 10-bit words are allocated for special purposes; in particular one is allocated as a synchronisation word. The translated words (referred to as data words, it being understood that this term includes the translated packet synchronisation bytes as well as the translated MPEG-2 data bytes) are presented to a parallel-to-serial converter and output in serial form at 270 Mbit/s. Gaps between data words are filled with synchronisation words so that the number of synchronisation words between each pair of consecutive data words is substantially constant. Of course, it can only be exactly constant if the incoming byte rate is an exact sub-multiple of the outgoing byte rate of 27 Mbyte/s.

FIG. 1 is a block diagram of a switching device. It has two inputs 11, 12 which receive respectively primary and secondary feeds of video in ASI format as described above. Its function is to convey one of the feeds to an output 13, again in ASI format, and, in the event of disturbance or interruption of that feed, to switch over to the other feed. The two feeds are referred to as primary and secondary in the expectation that the device always defaults to conveying the primary feed, and, after switching to the secondary feed, reverts to the primary feed when the disturbance or interruption has cleared. However it is equally possible to regard the feeds as being of equal status, in which case reversion is unnecessary. It is expected that the two feeds have the same information content (i.e. the same pictures) and that they are supplied by telecommunications links passing over different routes (to minimise the risk of both feeds being disturbed or interrupted) though neither of these factors is material to the technical functioning of the switching device per se. Note however that the switching device is designed to accommodate the possibility that the two feeds originate from separate ASI coders which, whilst operating at the same data rate, may not necessarily be in synchronisation—i.e. the number of synchronisation bytes between a given pair of data bytes may not necessarily be the same in the two feeds.

The primary input 11 is served by an ASI receiver 20. This is of conventional construction (for example as available from Cypress Semiconductor Corporation, as also is the ASI transmitter referred to below). It receives the ASI signal and serves to recover bit and (using the received synchronising words) byte synchronisation, and decodes the received 10-bit words. Each time it receives a 10-bit serial word which corresponds to an 8-bit data byte it outputs the byte DB1 in parallel format. A second output delivers an 'enable' signal EN1 whenever such a word is received. Thirdly, it outputs a byte clock $\phi 1$. ].

The recovered bytes DB1 are now restored to the original 204 (or 188)—byte sequence. These are fed via write circuitry 21 to a first-in-first-out (FIFO) buffer 22. Whenever the write circuitry receives the enable signal EN1 it writes the received byte into the buffer 22. Under normal operation, the bytes are read from the buffer by readout circuitry 23, under control of the same enable signal EN1. Upon start-up, the read circuitry does not begin reading until the buffer is half-full: once reading commences, the buffer fullness remains constant. Typically, the buffer will be of a size sufficient to accommodate 20 packets. Apart of course from the buffer delay, the sequence of data bytes DB1' read from the buffer is identical to the sequence DB1 input to it. This sequence is supplied to an ASI transmitter 14 which recodes the signal into ASI format before delivering it to the output 13.

The second input 12 is fed via an ASI receiver 40 and write circuitry 41 to a buffer 42 in exactly the same manner as described above. Read circuitry 43 are not active in this mode, and data bytes are not read out. The buffer is maintained at approximately half-occupancy by bleed circuitry 44 which, whenever the buffer occupancy exceeds the half-way point, deletes the oldest complete 204-byte (or 188 byte) packet from the buffer.

Before describing the response of the device to disturbances to the incoming signal, further circuitry to make this possible will be introduced. A timing device 26 is provided which receives the enable signals EN1 and the byte clock $\phi 1$. By counting the byte intervals between each occurrence of the enable signal it calculates the actual data rate (i.e. the number of enables per second or the average period between enables: note that is general this is not a whole number of byte periods). It uses this information to calculate the expected time of occurrence of the next enable signal and produces three byte-synchronous signals: a synthesised enable signal SE1 occurring at this expected time, a window signal W1 active during a period of five byte periods' duration centred on this expected time, and an extended window signal EW1, active during the expected time of occurrence, two byte-periods before and seven byte periods after. It will be seen that, by monitoring for disturbances at the input to the buffer, the delay occasioned by the buffer 22 allows, in the event of disturbance or interruption of the signal on the input 11, a period of grace during which to take remedial action, since uncorrupted data is still present in the buffer—(i.e. this provides a fault look-ahead technique). The same however cannot be said of the enable signal EN1 which is used to control buffer readout. Thus the response of the device to disturbance falls into two distinct phases.

(a) initial recognition of disturbances to the signal and substitution into the buffer readout process of the locally generated enable signal SE1 instead of the incoming enable signal EN1; and (b) recognition of serious disturbance and feeding the ASI transmitter 14 from the secondary feed, via the buffer 42.

In this embodiment, the criterion for initial recognition of disturbances is that the arrival of valid bytes as indicated by the enable EN1 does not correspond (within a margin of error) to that expected. The detection is performed by a detector 27 which produces an output signal DS1 in the event that either of two conditions is satisfied:

(i) that EN1 occurs outside the 5-byte window defined by W1 twice in succession (i.e. without the intervening occurrence of EN1 within the window)

(ii) that EN1 fails to occur during the 10-byte window defined by EW1.

The signal DS1 sets a latch 28 which, when set, produces an output signal DL1 which triggers a changeover switch 29 so that the synthesised enable signal SE1 is fed to the readout circuitry 23 instead of the received enable signal EN1. The signal DL1 is also fed back to the timing device 26 where it suppresses any further updating of the calculated data rate on the basis of the enable signals EN1 currently being received. Once this enable signal switchover has occurred, the signal DS1 is monitored for further disturbances. A dynamic timeout mechanism is employed, with a timeout period proportional to the packet rate of the current feed. This period TT is calculated (as described below) in the timing unit 26. When the latch 28 is set, a counter 30 is started—i.e. it is loaded with a value corresponding to the period TT and begins to count down. In the event that no further disturbance signals DS1 are received during the timeout period, a signal DR1 is generated by error decision logic 33, which resets the latch 28 and thus switches the switch 29 back to its original position. If however, at least one further disturbance has been detected, a signal DF1 is produced which initiates a process of switching over from the primary feed to the secondary feed.

The object of the dynamic timeout control is to ensure that the timeout period corresponds to a fixed number of packets, irrespective of the actual data rate. This ensures that the incoming signals are monitored over an adequate period, whilst ensuring that the feed switchover process can be completed before any serious disturbance has reached the output of the buffer 42.

Worked example of dynamic timeout period:
Incoming bit rate=26.181818 Mbit/s in 204 byte packets
Incoming byte rate=3.27272725 Mbytes/s
Incoming packet rate=16042.78 packet/s (204 byte packets)
Packet duration=62.3333 $\mu$s
Buffer capacity $\_\~$20 packets and thus 10 packets for mid point operation.
Since loss of signal takes 4 lost packets this would allow buffer to drop nearly half its normal operating level and this is deemed acceptable for dynamic timeout period.
Dynamic timeout period=4×Packet Duration=249.3333 $\mu$s The timer 26 thus, having ascertained the byte rate (as mentioned earlier), calculates the necessary count TT of the counter 30 to correspond to the required timeout period.

Additionally, a packet alignment detector 31 monitors the received bytes DB1. Following acquisition of packet synchronisation by a packet synchronisation unit 32, the detector 31 detects failure of the packet sync byte to appear on four consecutive packets and if so produces an output PSF1 to force initiation of switchover (irrespective on whether enable switchover has already occurred).

Note that the byte clock $\phi$ is used to clock data in to the FIFO 21 and to drive the discontinuity block 27, packet sync block 32, error detect block 31 and the data rate calculation part of the timing block 26. Not all of these connections are shown in FIG. 1.

The feed switching process is performed by a control unit 15 in the form of a stored program—controlled microprocessor. This process must be performed in an orderly fashion in order to ensure that switching occurs at a packet boundary, and is illustrated in the flowchart of FIG. 2.

In step 101, the control unit 15 checks whether the buffer 42 is in the process of being bled, in which case it waits until a packet boundary is located as indicated in step 102.

Once the buffer 42 is aligned at a packet boundary, the bleed unit 44 is locked (step 104) so that the buffer remains in readiness to output a complete packet. In step 105, the control unit checks whether the primary channel buffer readout circuit 23 has reached the end of a packet, and if not, it waits until it has. Then at 106, it switches a changeover switch 16 so that the ASI transmitter 14 is now fed from the secondary channel buffer readout circuit 43: the readout circuit 43 is then enabled so that the last packet output from the primary feed readout circuit 23 is directly followed by a complete packet from the secondary feed readout circuit 43.

If desired, provision may be made for fault conditions other than those described to initiate switching, for example an error detector (not shown) could monitor the parity of the 10-bit ASI words and/or error-check codes in the last 16 bytes of a 204-byte packet and feed a fault signal to a further input of the OR-gate 36 feeding the control unit 15.

Assuming that the two feeds are of equal status, the device remains switched to the secondary input, until such time as a disturbance on the secondary feed may initiate a switchover in the opposite direction. It should be understood that the two paths through the device are identical, thus the buffer 22 has bleed circuitry 24 like the bleed circuitry 44, and the items numbered 26 to 36 associated with the input 11 are duplicated for the lower input 12, though, in the interests of clarity, they are not shown in FIG. 1. Items 13, 14, 15 and 16 are common to both paths. If it is desired that the device should revert to the primary feed once the problem that gave rise to the switchover has cleared, this could of course be arranged. For example, a detector could be provided to monitor the outputs of the detectors 27 and 31 and, in the event that no disturbances or errors[] occur for a certain period—perhaps an hour, to instruct the control unit 15 to switch back. In this case, the bleed circuitry 44 and the lower-path duplicates of items 26 to 36 could be omitted, although this is not preferred since this would involve a loss of security during the period that the secondary feed is in use.

Another refinement that could be introduced, if desired, is to monitor the relative quality of the two feeds, and suppress any switching command if its effect would be to switch to a feed whose performance is actually worse than that currently supplying the output.

The device of FIG. 1 has been described as having two feeds; however the principle can easily be applied to systems with three or more—switching from one feed to another in strict rotation, for example, or choosing the one with the best signal.

It will be observed that the arrangement described above with reference to FIG. 1, although it ensures a continuous stream of whole packets at the input of the ASI transmitter 14, does not guarantee continuity of packets at the moment of switchover of the switch 16. In other words, it is possible that packet duplication or packet loss may occur. This is considered to be acceptable in the case of MPEG signals. If however, for any particular application, it is desired to avoid this, it would be possible, provided that the packets were labelled is some way, to provide additional circuitry to examine the packets in the buffers and to adjust the state of fullness of the buffer 42 (or 22 when the secondary feed is in use) so as to avoid such duplication or loss.

Finaly, the timing substitution technique described above could be used in systems with a single feed and no feed-switching; in such a case, only items 11, 23, 14, 20 to 23 and 27 to 29 would be required.

What is claimed is:

1. A method of switching between a first signal and a second signal, comprising
    (a) buffering the first signal in a first buffer;
    (b) buffering the second signal in a second buffer;
    (c) reading signals from the first buffer under control of timing signals obtained from the first signal and forwarding the read-out signals to an output; and
    (d) detecting disturbances of the first signal prior to its entry into the first buffer and upon such detection performing, in order, the steps of:
    (e) reading signals from the first buffer under control of locally generated timing signals in lieu of the timing signals obtained from the first signal;
    (f) adjusting the occupancy of the second buffer relative to the first; and
    (g) reading signals from the second buffer and forwarding the read-out signals to the output in lieu of the read-out signals from the first buffer.

2. A method according to claim 1 in which the step of detecting disturbances comprises detecting whether disturbances meet a first criterion and detecting whether the disturbances meet a second criterion, and wherein step (e) is performed whenever the first criterion is met; wherein if the second criterion is met then steps (f) and (g) are performed; and wherein if the second criterion is not met then buffer readout control reverts to the timing signals obtained from the first signal.

3. A method according to claim 2 in which the first criterion is that a predefined corruption of the first signal has occurred and the second criterion is that the corruption has persisted for a defined period.

4. A method according to claim 3 including measuring the data rate of the first signals and setting the defined period in dependence on the result.

5. A method according to claim 1 in which the signals have a packet structure and step (f) comprises waiting until completion of a packet currently being read from the first buffer before performing step (g).

6. A method according to claim 1 in which the signals have a packet structure and step (f) comprises adjusting the state of the second buffer in readiness for reading a complete packet and waiting until completion of a packet currently being read from the first buffer before performing step (g).

7. A method according to claim 1 in which the signals are received at intervals which vary in a predictable manner, in which the timing signals correspond to actual receipt of a signal and in which the predicted signals are predicted based on the timing of previously received signals.

8. An apparatus for switching between a first signal and a second signal, comprising
    a first buffer for receiving the first signal;
    a second buffer for receiving the second signal;
    means for obtaining timing signals from the first signal;
    timing means for generating substitute timing signals corresponding to a predicted timing of the first signal;
    means for detecting disturbances of the first signal prior to its entry into the first buffer; and
    control means operable in response to such detection to:
    (i) switch from a first mode of operation in which signals are read from the first buffer under control of the timing signals obtained from the first signal and forwarded to an output, to a second mode of operation in which signals are read from the first buffer under control of the substitute timing signals and forwarded to the output;
    (ii) adjust the occupancy of the second buffer relative to the first; and
    (iii) switch from the second mode of operation to a third mode of operation in which signals are read from the second buffer and forwarded to the output in lieu of the read-out signals from the first buffer.

9. An apparatus according to claim 8 in which the disturbance detection means is operable to detect whether disturbances meet a first criterion and whether the disturbances meet a second criterion, and wherein the control means is operable: whenever the first criterion is met, to switch from the first mode to the second mode; if the second criterion is met, to adjust the occupancy of the second buffer relative to the first and switch from the second mode to the third mode; and if the second criterion is not met, to switch from the second mode to the first mode.

10. An apparatus according to claim 9 in which the first criterion is that a predefined corruption of the first signal has occurred and the second criterion is that the corruption has persisted for a defined period.

11. An apparatus according to claim 10 in which the timing means includes means for measuring the data rate of the first signals and setting the defined period in dependence on the result.

12. An apparatus according to claim 8 in which the signals have a packet structure and the adjustment of relative buffer occupancy comprises waiting until completion of a packet currently being read from the first buffer before switching from the second mode to the third mode.

13. An apparatus according to claim 8 in which the signals have a packet structure and the adjustment of relative buffer occupancy comprises adjusting the state of the second buffer in readiness for reading a complete packet and waiting until completion of a packet currently being read from the first buffer before switching from the second mode to the third mode.

14. An apparatus according to claim 8 further comprising:

means for obtaining timing signals from the second signal;

timing means for generating second substitute timing signals corresponding to a predicted timing of the second signal;

means for detecting disturbances of the second signal prior to its entry into the second buffer;

the control means being operable, when in the third mode of operation, in response to such detection to:

(iv) switch from the third mode of operation to a fourth mode of operation in which signals are read from the second buffer under control of the second substitute timing signals and forwarded to the output;

(v) adjust the occupancy of the first buffer relative to the second; and (vi) switch from the fourth mode of operation to the first mode of operation.

\* \* \* \* \*